TEMPERATURE COMPENSATING UNIT FOR CRYSTAL OSCILLATORS

Filed Nov. 9, 1967 2 Sheets-Sheet 1

Inventor
PETER B. PAGE
By Alfred C. Hill
Agent

TEMPERATURE COMPENSATING UNIT FOR CRYSTAL OSCILLATORS

Filed Nov. 9, 1967 2 Sheets-Sheet 2

Inventor
PETER B. PAGE
By Alfred C. Hill
Agent

United States Patent Office 3,503,010
Patented Mar. 24, 1970

3,503,010

TEMPERATURE COMPENSATING UNIT FOR CRYSTAL OSCILLATORS

Peter Bernard Page, Harlow, Essex, England, assignor to International Standard Electric Corporation, New York, N.Y., a corporation of Delaware Filed Nov. 9, 1967, Ser. No. 681,624
Claims priority, application Great Britain, Nov. 18, 1966, 51,816/66
Int. Cl. H03b 3/12
U.S. Cl. 331—176 5 Claims

ABSTRACT OF THE DISCLOSURE

The linear term of the temperature coefficient of an AT-cut crystal is temperature compensated for by altering linearly the bias voltage applied to a variable capacitance diode by means of a temperature sensitive resistor-resistor voltage divider network coupled in shunt relation with a voltage stabilized source.

BACKGROUND OF THE INVENTION

The invention relates to temperature compensating units for correcting frequency variations due to temperature changes in systems employing crystal oscillators.

SUMMARY OF THE INVENTION

A feature of the present invention is the provision of a temperature compensating unit for correcting frequency variations due to temperature changes in systems employing crystal oscillators comprising a crystal oscillator including a crystal to be temperature compensated; variable reactance means coupled to the crystal; voltage stabilizing means; and a temperature compensating network having a linear voltage temperature characteristic coupled in shunt relation to the stabilizing means and across the reactance means to maintain the resonant frequency of the oscillator constant over a given working temperature range.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

Figure 1:
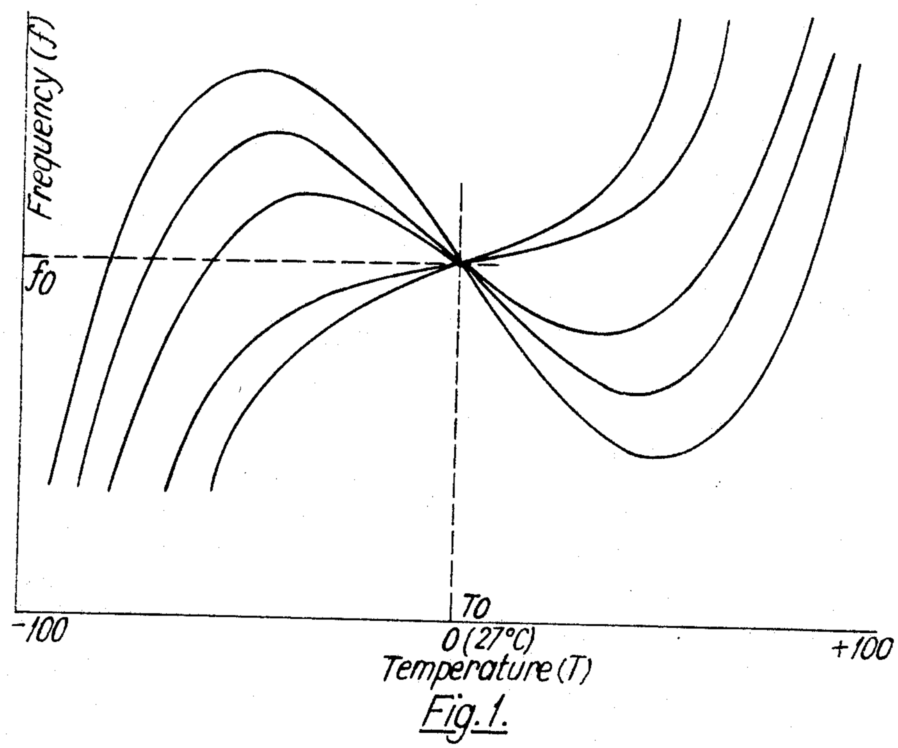
FIG. 1 shows a family of frequency-temperature curves for an AT-cut quartz crystal.

The frequency of a quartz crystal oscillator changes with temperature mainly due to the temperature coefficient of the AT-cut crystal which has mainly a fixed cubic term together with a linear term which is a function of the cutting angle. A family of frequency-temperature curves for an AT-cut crystal are shown in the drawing according to FIG. 1.

Referring to FIG. 1, the family of curves are approximately symmetrical about the point with co-ordinates $f_0$, $T_0$, where $f_0$ is the frequency of the crystal at the inflexion temperature $T_0$ (approximately 27° C. for the AT-cut crystal).

For a given crystal unit design, the different curves obtained are due to the tolerance on the angle at which the crystal element is cut from the quartz crystal and as previously stated the different curves have a fixed cubic term but a different linear term.

Figure 2:
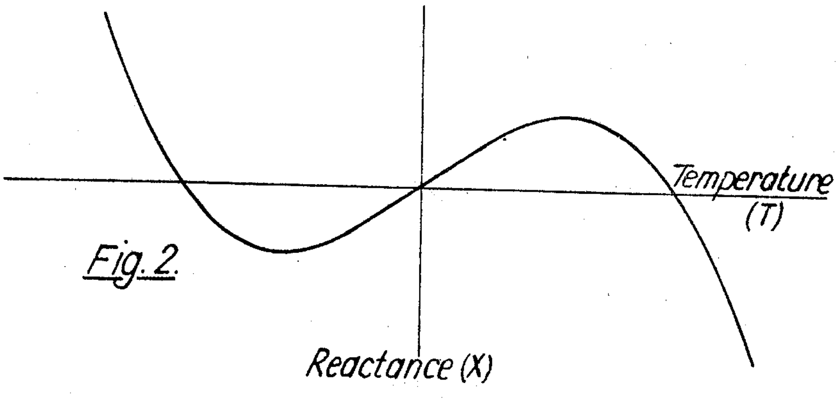
FIG. 2 shows a reactance-temperature curve for an AT-cut crystal at a fixed frequency.

Referring to FIG. 2, the reactance-temperature curve for an AT-cut crystal of one particular angle is shown for the frequency $f_0$. The reactance which, connected in series with the crystal, would bring the frequency back to $f_0$ is equal to the negative of the crystal reactance. The inverse of the curve according to FIG. 2 is substantially identical in shape to the frequency-temperature curve from which it is derived since the crystal reactance is proportional to frequency deviation where this is small.

If a variable reactance, for example a variable capacitance diode, is connected in series or in parallel (depending on the oscillator circuit) with an AT-cut crystal unit, variation of this reactance in the manner outlined above will cause the crystal oscillators reasonant frequency to be maintained substantially constant over a selected working temperature range.

Figure 3:
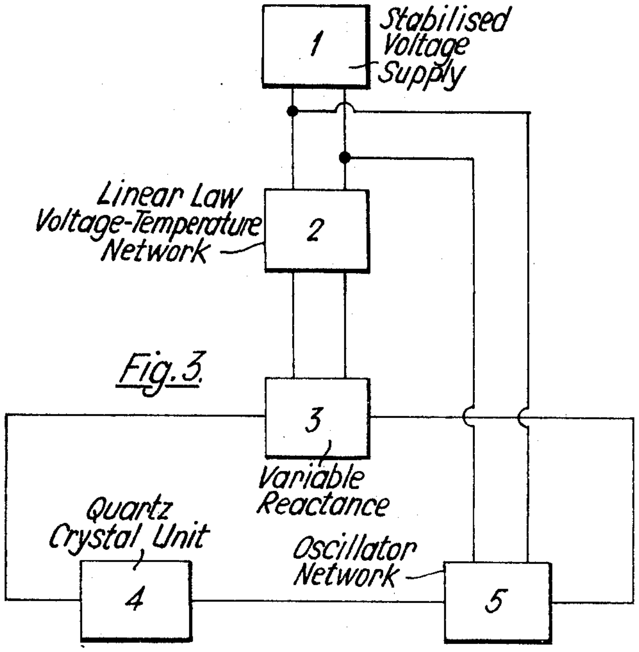
FIG. 3 shows a block diagram of a compensating unit accordinging to the present invention for correcting frequency variations due to temperature changes in a system which employs a quartz crystal oscillator.

The block diagram shown in FIG. 3 comprising stabilized voltage supply 1, linear law voltage-temperature network 2, variable reactance quartz crystal unit 4 and oscillator network 5 shows a method of varying variable reactance 3 in order to provide a linear correction for the temperature coefficient effect. The compensation in this system is effective over a temperature range of the order of −20° C. to +70° C., i.e., the linear section of the curves shown in FIG. 1, with an overall accuracy of the order of ±3 p.p.m.

Figure 4:
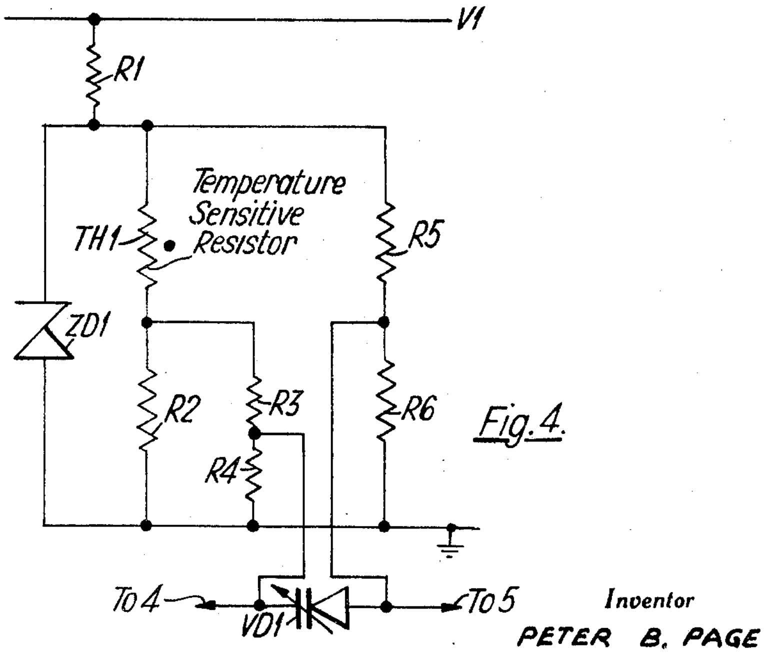
FIG. 4 shows a schematic circuit diagram for the blocks 1 to 3 of FIG. 3.

FIG. 4 shows a schematic circuit diagram for blocks 1 to 3 shown in FIG. 3 in which stabilized voltage supply 1 comprises Zener diode ZD1 which is connected in series with resistor R1 between ground potential and electrical supply V1 for oscillator network 5.

Linear law voltage-temperature network 2 comprises temperature sensitive resistance TH1 having a negative temperature coefficient, for example, a thermistor, connected in series with resistor R2 across Zener diode ZD1, resistor R5 connected in series with resistor R6 across Zener diode ZD1, and resistor R3 connected in series with resistor R4 between ground potential and the junction of resistor TH1 and resistor R2.

Variable reactance 3 which is represented in FIG. 4 by variable capacitance diode VD1 is connected between the junction of resistors R3 and R4 and the junction of resistors R5 and R6.

The value of resistor R1 determines the operating voltage level for linear law voltage-temperature network 2 and, thereby, the operating level of stabilized voltage supply 1, i.e., Zener diode ZD1.

The value of resistor R2 is selected in conjunction with resistor TH1 in order to provide at one side of variable capacitance diode VD1, by the voltage divider including resistors R3 and R4, a voltage which varies with temperature in accordance with a linear law.

The slope of the linear voltage-temperature compensating signal characteristic may be varied to suit quartz crystal unit 4 by varying the values of resistors R3 and R4, i.e., the potential on one side of variable capacitance diode VD1, and the values of resistors R5 and R6 are selected such that at the inflexion temperature $T_0$ the voltage on the other side of variable capacitance diode VD1 causes variable capacitance diode VD1 to be biased to a voltage level which will cause a reactance to be connected in series with quartz crystal unit 4 which will allow oscillator network 5 to oscillate at the frequency $f_0$ i.e., the inflexion temperature $T_0$ frequency (see FIG. 1). In practice, the slope of the linear voltage-temperature compensating signal characteristic and the inflexion temperature $T_0$ frequency are respectively varied by varying the value of resistors R4 and R6.

The potential divider networks comprising resistors R3 and R4 and resistors R5 and R6 and which are in practice high impedance networks may be replaced by variable resistors. If variable resistors are used, the slider arms of the variable resistors would be connected to each side of variable capacitance diode VD1.

In the event that the potential divider networks, or the variable resistors are not of a high impedance, then it will be necessary to interpose a high impedance fixed resistance between each side of variable capacitance diode VD1 and the potential divider networks, or the variable resistors.

Since the reactance of variable capacitance diode VD1 is the inverse of the voltage applied thereto by arranging the voltage output from linear law voltage-temperature network 2 to vary with temperature in the same manner as the reactance of quartz crystal unit 4 varies with temperature, i.e., as shown in FIG. 2, the reactance which is connected in series with quartz crystal unit 4 will be the negative of the quartz crystal reactance and will, therefore, maintain the resonance frequency of crystal oscillator network 5 substantially constant over a selected working temperature range.

The compensating unit outlined above allows sufficient capacitance change to enable the quartz crystal unit to be either fundamental or third overtone crystal and this compensating unit is more stable with time and simpler to set up compared with conventional compensating systems which utilize high temperature coefficient capacitors.

The circuit diagram of FIG. 4 is used when quartz crystal unit 4 to be temperature compensated has a frequency-temperature characteristic (shown in FIG. 1) which has a linear section having a negative slope. If it is required to temperature compensate a quartz crystal unit having a frequency-temperature characteristic which has a linear section having a positive slope, with the circuit shown in FIG. 4 then temperature sensitive resistance TH1 should either have a positive temperature coefficient, or reverse its circuit position with resistor R2, i.e., be shunted by the series connected resistors R3 and R4.

It should be noted that quartz crystal units having frequency-temperature characteristics which have linear sections having negative slopes can also be temperature compensated with the circuit of FIG. 4 if temperature sensitive resistance TH1 has a positive temperature coefficient and its circuit locations is changed with resistor R2, i.e. be shunted by the series connected resistors R3 and R4.

While I have described above the principles of my invention in connection with specific apparatus, it is to be clearly understood that this description is made only by way of example and not as a limitation to the scope of my invention as set forth in the objects thereof and in the accompanying claims.

I claim:

1. A temperature compensating unit for correcting frequency variations due to temperature changes in systems employing crystal oscillators comprising:
- a crystal oscillator including a crystal to be temperature compensated;
- variable reactance means coupled to said crystal;
- voltage stabilizing means; and
- a temperature compensating network having a linear voltage-temperature characteristic coupled in shunt relation to said stabilizing means and across said reactance means to maintain the resonant frequency of said oscillator constant over a given working temperature range;
- said network consisting of
  - a temperature sensitive resistor having a given temperature coefficient,
  - a first resistor directly connected in series with said temperature sensitive resistor,
  - said temperature sensitive resistor and said first resistor being directly connected in shunt relation to said stabilizing means,
  - a first voltage divider directly connected in shunt relation with one of said resistor and said temperature sensitive resistor,
  - a first conductor directly connecting one side of said reactance means to said first voltage divider,
  - a second voltage divider directly connected in shunt relation to said temperature sensitive resistor and said first resistor, and
  - a second conductor directly connecting the other side of said reactance means to said second voltage divider.

2. A unit according to claim 1 wherein said variable reactance means includes a variable capacitance diode.

3. A temperature compensating unit for correcting frequency variations due to temperature changes in systems employing crystal oscillators comprising:
- a crystal oscillator including a crystal to be temperature compensated;
- variable reactance means coupled to said crystal;
- voltage stabilizing means; and
- a temperature compensating network having a linear voltage-temperature characteristic coupled in shunt relation to said stabilizing means and across said reactance means to maintain the resonant frequency of said oscillator constant over a given working temperature range;
- said variable reactance means including a variable capacitance diode;
- said stabilizing means including a source of voltage for said oscillator, ground potential and a first series circuit including a Zener diode and a first resistor coupled between said source of voltage and said ground potential; and
- said network consisting of
  - a second series circuit consisting of a temperature sensitive resistor having a given temperature coefficient and a second resistor, said second series circuit being directly connected in shunt relation with said Zener diode,
  - a third series circuit consisting of third and fourth resistors, said third series circuit being directly connected between the junction of said temperature sensitive resistor and said second resistor and said ground potential,
  - a first conductor directly connecting the junction of said third and fourth resistors to one electrode of said capacitance diode,
  - a fourth series circuit consisting of fifth and sixth resistors, said fourth series circuit being directly connected in shunt relation with said second series circuit, and
  - a second conductor directly connecting the junction of said fifth and sixth resistors to the other electrode of said capacitance diode.

4. A unit according to claim 3, wherein said crystal is an AT-cut quartz crystal.

5. A unit according to claim 1, wherein said crystal is an AT-cut quartz crystal.

References Cited

UNITED STATES PATENTS

| | | | |
|---|---|---|---|
| 3,054,966 | 9/1962 | Etherington | 331—176 |
| 3,176,244 | 3/1965 | Newell et al. | 331—116 |
| 3,200,349 | 8/1965 | Bangert | 331—176 |
| 3,373,379 | 3/1968 | Black | 331—176 |
| 3,397,367 | 8/1968 | Steel et al. | 331—176 |

JOHN KOMINSKI, Primary Examiner

U.S. Cl. X.R.

331—158